United States Patent [19]

Dewitte et al.

[11] 4,115,504

[45] Sep. 19, 1978

[54] METHOD FOR CASTING VITREOUS MATERIALS USING THE LOST WAX PROCESS

[75] Inventors: Jean Dewitte, Boulogne; Pierre Letourneur, Paris, both of France

[73] Assignee: Compagnie Internationale de Minerallurgie-CIM, Neuilly-sur-Seine, France

[21] Appl. No.: 741,452

[22] Filed: Nov. 12, 1976

[30] Foreign Application Priority Data

Nov. 19, 1975 [FR] France .................................. 75 35301

[51] Int. Cl.² ............................................... B29C 1/02
[52] U.S. Cl. ........................................ 264/221; 65/72; 264/235; 264/299; 264/317; 264/DIG. 44
[58] Field of Search ............... 264/221, DIG. 44, 332, 264/317, 235; 65/122, 72

[56] References Cited

U.S. PATENT DOCUMENTS

| | | | |
|---|---|---|---|
| 3,420,644 | 1/1969 | Lirones | 264/221 |
| 3,520,668 | 7/1970 | Keefer | 264/221 |

FOREIGN PATENT DOCUMENTS 986,289  3/1965  United Kingdom .................... 264/332

*Primary Examiner*—Robert F. White
*Assistant Examiner*—John A. Parrish
*Attorney, Agent, or Firm*—Pennie & Edmonds

[57] ABSTRACT

A method for casting vitreous materials using the lost wax process in which a pattern of the article to be cast is formed with a substance which is vaporized at the casting temperature of the vitreous material. The pattern is embedded in a heat resistant silica compound such as sand which surrounds the pattern to form a casting mold. The sand is contained in a receptacle called a casting shell. The vitreous material is heated to a temperature at which its viscosity is between 20 and 100 poises and the article is cast.

18 Claims, No Drawings

METHOD FOR CASTING VITREOUS MATERIALS USING THE LOST WAX PROCESS

BACKGROUND OF THE INVENTION

1. Field of the Invention

This invention relates to a process for casting vitreous articles using the lost wax process.

2. Description of the Prior Art

Casting of articles using the lost wax process is one of the oldest metallurgical procedures. First, a pattern of the article to be cast is made using a substance which is vaporized at the temperature employed during casting. Wax is often used for such patterns. The pattern is embedded in a heat resistant silica compound such as sand or microballs of a refractory oxide which surrounds the pattern to form a casting mold. The sand or microballs are contained in a receptacle called a casting shell. During casting, the pattern is vaporized and replaced by the casting material. The gases released are emitted through the casting mold.

Over the years, numerous improvements have been made in the process. Recently, it has been rendered more economical by employing vaporizable patterns of relatively low-cost materials such as polystyrene or polyethylene. However, because of the high fusion temperature and low rate of solidification of vitreous materials, casting of vitreous articles using the lost wax process was regarded as generally impossible. This was primarily due to the fact that the mold could not be filled with the vitreous materials without being damaged.

In casting vitreous materials and particularly glass, a delicate balance exists between the allowable temperatures and viscosities of the vitreous material during the casting operation. For example, if the vitreous material is cast at too low a temperature, it will solidify too rapidly, particularly in the area adjacent to the inner walls of the sand mold, i.e., where the sand mold contacts the surface of the volatizable pattern. Moreover, as the casting operation proceeds, the vitreous material forms a number of loosely cohesive layers in the area adjacent to the inner walls of the mold. When the casting temperature is too low, fragile zones and devitrification zones are formed in this area. These zones can cause the article to break.

Another problem arising when the temperature of the vitreous material during casting is too low is that the gases released as the pattern undergoes volatization are unable to pass through the excessively viscous mass of cast material. This produces imperfections in the finished article.

In casting vitreous articles, the viscosities of the vitreous material during the casting operation is ordinarily maintained at about $10^3$ to $10^4$ poises. These viscosities correspond to the highest temperatures in the glass working range for casing operations. The glass working range covers viscosities between $10^3$ and $10^7$ poises. When casting vitreous articles using the lost wax process the viscosities in the glass working range are too high to be successfully employed. Even a viscosity of only $10^3$ poises is still too high to enable the utilization of the lost wax process.

It is possible to heat the glass to a temperature at which it flows very well due to its lower viscosity. However, these low viscosities, and their attendant high temperatures, often cause damage to the mold when the two come into contact. To alleviate this problem, the pattern can be coated with a thin layer of a mixture of graphite and a refractory powder before being placed in the casting sand. Yet the vitreous material due to its low viscosity may pierce the layer of graphite and refractory powder and seep into the adjacent layers of sand making it impossible to obtain an article corresponding to the desired pattern. This is especially true when its viscosity is low enough so that the material adequately fills the pattern. By coating the pattern with a thick layer of graphite and refractory powder, this problem can be prevented. The difficulties involved in producing this thick layer, however, would prevent commercial utilization of the process since it would require several successive layers, each requiring additional drying time. Nevertheless, in casting complex articles, for example, a spiral spring or a pattern in the form of a cross with enlarged sections at the ends of its arms, the viscosity of the vitreous material during casting must be low enough so that the vitreous material correctly fills the entire mold. Yet, if the viscosity of the vitreous material is too low the material will pierce the mold.

SUMMARY OF THE INVENTION

Applicants have discovered that the lost wax process can be used in casting glass or other vitreous articles if the viscosity of the casting material is maintained between 20 and 100 poises and preferably between 20 and 60 poises during casting. At these viscosities, the casting material does not pierce the mold, yet it correctly fills the entire mold without forming cavities.

It is advantageous to remove the cast article from the mold before its temperature has fallen below the stress temperature. The stress temperature is defined as that temperature above which the internal stresses in the glass have essentially relaxed. According to French Standard NF-B 30-010, the cast vitreous articles reach their stress temperature in about four hours.

When the lost wax process is used to cast glass or other vitreous materials, it is preferred to moisten the casting sand and add a cohesive material, for example, a resin. This insures that the portion of the sand mold adjacent to the surface of the cast articles dries thoroughly. The cohesive material in the sand solidifies to form a rigid shell enclosing the cast article enabling the article to be handled in this form. The cast article is removed from the sand mold and annealed in the shell after which the shell is removed.

In another embodiment, the vitreous material is a ceramifiable glass, i.e., a glass which is crystallized by a ceramification treatment. In such cases, the desired ceramification treatment is selected before the article is cast and the treatment itself follows the casting and possibly the annealing. When a ceramificable material is used, the cast article is allowed to cool in the sand mold while the mold remains in the casting shell. When the temperature of the article is slightly lower than the nucleation temperature (which corresponds to the first stage of the thermal ceramification treatment), but before its temperature falls below the stress temperature, the article can be ceramified by fluidizing the sand contained in the casting shell. In casting ceramifiable glass articles in moistened sand containing a cohesive additive, the articles are preferably maintained in the resulting shell throughout the thermal ceramification treatment. Afterwards, the shell is removed.

DETAILED DESCRIPTION OF THE INVENTION

The details of the casting operation are amply described in the following examples.

EXAMPLE 1

The selected composition is a ceramificable vitreous material of $SiO_2$ — $Al_2O_3$ — $B_2O_3$ with $Fe_2O_3$ and CaO (or MgO) and includes a nucleating agnet of $Cr_2O_3$.

The glass composition (expressed in weight percent) after diffusion of the starting materials and refining is:
$SiO_2$: 37%
$Fe_2O_3$: 22%
CaO: 32%
$B_2O_3$: 4%
$Al_2O_3$: 4.25%
$Cr_2O_3$: 0.75%

Patterns of a polystyrene of polyethylene foam, which are quickly vaporized at the casting temperature of the above material, are embedded in sand which surrounds the pattern to form a casting mold. The patterns are disposed on casting plates which enable easy removal of the articles after the casting is complete. The patterns comprise a dead head surmounted by a refractory steel or graphite funnel through which the vitreous material is poured. The sand is of the type ordinarily used in the lost wax process, i.e., it has a relatively fine granulometry and is slightly moist. The temperature of the glass to be cast is increased until its viscosity is between 20 and 60 poises. The casting operation is then performed.

The ceramificable glass of the present example has respective viscosities of:
95 poises at 1176° C.
57 poises at 1200° C.
21 poises at 1230° C.

After the articles have been cast, they are cooled in the sand until they have set sufficiently to be handled without risk of deformation. This usually takes about 5 to 10 minutes, depending on their volume. The articles are then removed from the mold. The articles have a temperature of approximately 600° C. and are annealed. The annealing is carried out at approximately 30° C. above the annealing point of the glass, i.e., the temperature above which the stresses in the glass are essentially relaxed in 15 minutes as defined in French Standard NF-B 30-010. After approximately one hour at the annealing temperature, the articles are slowly cooled to 500° C. at a rate of about 0.5° C. to 1° C. per minute. The temperature of the articles is returned to ambient at a rate not exceeding 10° C. per minute.

EXAMPLE 2

The material of Example 1 is cast according to the procedure described in that example, except that the casting sand contains a cohesive additive. After casting, the articles are cooled in the sand until they can be handled without risk of deformation. The cast articles are encased in a rigid shell which formed due to the presence of the cohesive material in the sand. Without removing the shell, the articles are ceramified in a thermal treatment furnace. To obtain nucleation, the temperature of the furnace is maintained for 30 minutes at 600° C. The temperature is then raised to 850° C. at a rate of about 2° to 5° C. per minute. To obtain crystallization, the temperature is maintained at 850° C. for 10 minutes to 1 hour, according to the desired ceramification rate. The article is slowly cooled and the shell is removed.

EXAMPLE 3

The material of Example 1 is cast according to the procedure described in that example. The cast articles are cooled in the sand until their temperature is slightly lower than the nucleation temperature, but still above the stress temperature.

Without removing the articles from the sand, the sand is fluidized by means of a hot stream of gas and is brought to the temperature required for thermal ceramification. As described in Example 2, the temperature is maintained at 600° C. for 30 minutes to produce nucleation. Thereafter, it is raised to 850° C. and maintained at this temperature for ½ to 1 hour to produce ceramification.

In order to ceramify the article while it remains in the sand, a special mold is employed. The base of the mold consists of a porous material or a fine metal mesh in which the mesh openings are smaller than the diameter of the individual grains of sand. The base is integral with the casting shell. A sealed casing is attached below the porous material into which a supply duct opens through which the heated gas passes. The walls of the casting shell extend upwards to a higher level than normal to prevent the sand from escaping at the top when the sand is fluidized. When the sand enters the fluidized state, the cast article descends and comes to rest on the mold base plate. If necessary, a catch plate, such as a grill or tripod, can be placed directly beneath the vaporizable pattern.

We claim:

1. A process for casting vitreous materials according to the lost wax process comprising:
   (a) making a pattern of an article to be cast using a substance which is vaporized at the casting temperature of the vitreous material;
   (b) embedding the vaporizable pattern in a heat resistant silica compound such as sand or microballs of a refractory oxide which surrounds the pattern to form a casting mold, the sand or microballs being contained in a receptacle called a casting shell;
   (c) casting the vitreous material at a temperature at which its viscosity is between 20 and 100 poises; and
   (d) removing the cast article from the casting mold.

2. The process of claim 1 wherein the viscosity of the vitreous material during casting is between 20 and 60 poises.

3. The process of claim 1 wherein the vaporizable pattern is coated with a thin layer of a mixture of graphite and a refractory powder.

4. The process of claim 1 further comprising annealing the cast article after removing it from the casting mold.

5. The process of claim 1 wherein the vitreous material consists of a ceramifiable glass.

6. The proces of claim 5 wherein the viscosity of the cermifiable glass during casting is between 20 and 60 poises.

7. The process of claim 5 further comprising annealing the ceramifiable glass after removing it from the casting mold.

8. The process of claim 7 further comprising ceramifying the glass after annealing.

9. The process of claim 8 wherein the ceramifying step comprises fluidizing the casting sand contained in the casting shell.

10. A process for casting vitreous materials according to the lost wax process comprising:
(a) making a pattern of an article to be cast using a substance which is vaporized at the casting temperature of the vitreous material;
(b) embedding the vaporizable pattern in moistened sand which includes a cohesive material which surrounds the pattern to form a casting mold, the sand being contained in a receptacle called a casting shell;
(c) casting the vitreous material at a temperature at which its viscosity is between 20 and 100 poises, thereby forming a rigid shell encasing the cast article due to the presence of the cohesive material; and
(d) removing the article from the casting mold.

11. The process of claim 10 wherein the viscosity of the vitreous material during casting is between 20 and 60 poises.

12. The process of claim 10 further comprising annealing the cast article in the rigid shell after the article is removed from the casting mold.

13. The process of claim 10 wherein the vitreous material consists of a ceramifiable glass.

14. The process of claim 13 wherein the viscosity of the ceramifiable material during casting is between 20 and 60 poises.

15. The process of claim 13 further comprising annealing the ceramifiable glass in the rigid shell.

16. The process of claim 15 further comprising ceramifying the annealed glass in the rigid shell.

17. The process of claim 16 wherein the ceramifying step comprises fluidizing the casting sand contained in the casting shell.

18. The process of claim 1 wherein the cast article is removed from the casting mold when the cast article is at a temperature above the stress temperature.

* * * * *